United States Patent
Miscuglio et al.

(10) Patent No.: US 12,518,824 B2
(45) Date of Patent: Jan. 6, 2026

(54) LOW LOSS MULTISTATE PHOTONIC MEMORIES

(71) Applicant: The George Washington University, Washington, DC (US)

(72) Inventors: Mario Miscuglio, Arlington, VA (US); Volker J. Sorger, Alexandria, VA (US)

(73) Assignee: The George Washington University, Washington, DC (US)

( * ) Notice: Subject to any disclaimer, the term of this patent is extended or adjusted under 35 U.S.C. 154(b) by 470 days.

(21) Appl. No.: 17/927,282

(22) PCT Filed: May 26, 2021

(86) PCT No.: PCT/US2021/034286
§ 371 (c)(1),
(2) Date: Nov. 22, 2022

(87) PCT Pub. No.: WO2021/242881
PCT Pub. Date: Dec. 2, 2021

(65) Prior Publication Data
US 2023/0207008 A1    Jun. 29, 2023

Related U.S. Application Data

(60) Provisional application No. 63/029,759, filed on May 26, 2020.

(51) Int. Cl.
*G11C 13/04*      (2006.01)
*G11C 13/00*      (2006.01)

(52) U.S. Cl.
CPC ........ *G11C 13/046* (2013.01); *G11C 13/0069* (2013.01); *G11C 2013/008* (2013.01)

(58) Field of Classification Search
CPC .............. G11C 13/046; G11C 13/0069; G11C 2013/008; G11C 13/0004; G11C 13/004; G11C 13/04
See application file for complete search history.

(56) References Cited

U.S. PATENT DOCUMENTS

| 2018/0267386 A1* | 9/2018 | Rios .................. G02F 1/313 |
| 2019/0069347 A1 | 2/2019 | Lee |
| 2020/0285083 A1 | 9/2020 | Fang et al. |

FOREIGN PATENT DOCUMENTS

WO    2021211125 A1    10/2021

OTHER PUBLICATIONS

International Search Report and Written Opinion for PCT/US2021/034286 dated Nov. 15, 2021, 12 pgs.
(Continued)

*Primary Examiner* — Andrew Sasinowski
(74) *Attorney, Agent, or Firm* — BLANK ROME LLP

(57) ABSTRACT

Multistate non-volatile photonic memory devices are disclosed. The photonic devices comprise phase change materials with broadband transparencies used to store discretized information with negligible losses in the 0 state. The photonic memories comprise multiple configurations for reading and writing multi-bit words. The reading mechanisms comprises schemes based on light-absorption (FIG. 1), shift in resonances of a cavity (ring resonator, photonic crystal; FIG. 2) or interferometric schemes (FIG. 3). The photonic memory devices employ multiple techniques for writing electrically (FIG. 4 and related performance) and/or all-optically (FIGS. 7-10). The optical writing can be performed with pulsed laser light coming either from free space or on-chip using dedicated writing lines and opportune drops.

16 Claims, 8 Drawing Sheets

(56) References Cited

OTHER PUBLICATIONS

C. Rios, et al., "On-Chip Photonic Memory Elements Employing Phase-Change Materials", Advanced Materials, 2014, vol. 26, pp. 1372-1377.
C. Ríos et al., "In-memory computing on a photonic platform," Science Advances, vol. 5, No. 2, p. eaau5759, Feb. 2019, doi: 10.1126/sciadv.aau5759, 9 pages.
C. Ríos et al., "Integrated all-photonic non-volatile multi-level memory," Nature Photon, vol. 9, No. 11, pp. 725-732, Nov. 2015, doi: 10.1038/nphoton.2015.182, 9 pages.
R. E. Simpson et al., "Interfacial phase-change memory," Nature Nanotechnology, vol. 6, No. 8, pp. 501-505, Aug. 2011, doi: 10.1038/nnano.2011.96, 5 pages.
Y. Zhang et al., "Broadband transparent optical phase change materials for high-performance nonvolatile photonics," Nature Communications, vol. 10, No. 1, pp. 1-9, Sep. 2019, doi: 10.1038/s41467-019-12196-4, 9 pages.

\* cited by examiner

LOW LOSS MULTISTATE PHOTONIC MEMORIES

CROSS-REFERENCE TO RELATED APPLICATION

This application is a national phase application of PCT/US2021/034286, filed May 26, 2021, which claims the benefit of priority of U.S. Application Ser. No. 63/029,759 filed on May 26, 2020. The contents of these applications are relied upon and incorporated herein by reference in their entirety.

BACKGROUND

The nonvolatile retention of information in integrated photonics can be provided by the light-matter interaction in phase change memory (PCM). Phase change materials are material, typically intended as GST, having a thin layer of an alloy of germanium, antimony, and tellurium. When heated with an intense pulse of laser light or electrothermally, GST film changes its atomic structure between an ordered crystalline lattice and an "amorphous" state. These two structures reflect and absorb light in different ways. For example, see the following papers, which are hereby incorporated by reference: C. Rios et al., "In-memory computing on a photonic platform," Science Advances, vol. 5, no. 2, p. eaau5759, February 2019, doi: 10.1126/sciadv.aau5759; Y. Zhang et al., "Broadband transparent optical phase change materials for high-performance nonvolatile photonics," Nature Communications, vol. 10, no. 1, pp. 1-9, September 2019, doi: 10.1038/s41467-019-12196-4; R. E. Simpson et al., "Interfacial phase-change memory," Nature Nanotechnology, vol. 6, no. 8, pp. 501-505, August 2011, doi: 10.1038/nnano.2011.96; C. Rios et al., "Integrated all-photonic non-volatile multi-level memory," Nature Photon, vol. 9, no. 11, pp. 725-732, November 2015, doi: 10.1038/nphoton.2015.182; C. Rios et al., "In-memory computing on a photonic platform," Science Advances, vol. 5, no. 2, p. eaau5759, February 2019, doi: 10.1126/sciadv.aau5759.

To read out the data, stored as patterns, it is possible to shine low-intensity laser light in a photonic chip and probe the variation of the transmitted light due to the GST-light interaction according to its state. In such a material, the variation of the phase can be induced by local heating, either thermally (heaters), electrostatically (contacts), or all-optically (laser). However, even if these materials exhibit large contrast of both refractive index ($\Delta n$) and optical loss ($\Delta k$), simultaneously, they are characterized by relatively high insertion losses, high switching energy and poor number of cycles, which can potentially limit the number of neurons and the depth of the network, and concurrently the number of times that the network can be updated. Also, strategies for efficiently recording more information in the photonic memories are still outstanding.

SUMMARY

It is possible to break the dichotomy between photonic processor and memory used as nonvolatile memories that can be written, erased (either optically or electronically) and accessed optically in picoseconds. This will allow to perform computing near the memory, thus avoiding cumbersome electro-optic conversions. The present disclosure relates to retention of information in integrated photonic devices. Certain embodiments of the disclosure concern photonic memory systems, optical sensing, optical processing and computational systems.

The present disclosure provides a low loss multistate photonic memory device based on stoichiometrically engineered phase change materials (Ge2Sb4Se4Te1 or Ge2Sb2Se5), which uses an electro-thermal interaction or an enhanced light matter interaction for storing data in a nonvolatile fashion, whereas using photons for reading it, yielding a limited surface area without the use of DAC and phase tuners.

This summary is not intended to identify all essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which:

FIG. 4($b$) shows a cross-section of another exemplary embodiment of a memory cell employing an electrical heater for writing/erasing the cell;

FIG. 5($b$) is a graph showing a signal needed to move a cell from a crystalline state to an amorphous state;

FIG. 5($c$) is a graph showing a signal needed to move a cell from an amorphous state to a crystalline state;

FIG. 6($b$) shows the simulation of the TM and TE optical modes in the waveguide under PCM layers in amorphous and crystalline states.

FIG. 6($c$) shows the normalized electric field in the yz plane of a propagating wave (TM mode) for different digital states in a 4-bit multistate photonic memory device.

FIG. 6($d$) shows a graph of the insertion losses of a photonic memory in different states which are the losses inserted by different number of wires of amorphous GSSe;

FIG. 6($e$) shows the optical read signal extinction ratio dependence of the digital states (0000 to 1111) and the number of wires in crystalline state.

DETAILED DESCRIPTION

Figure 1:
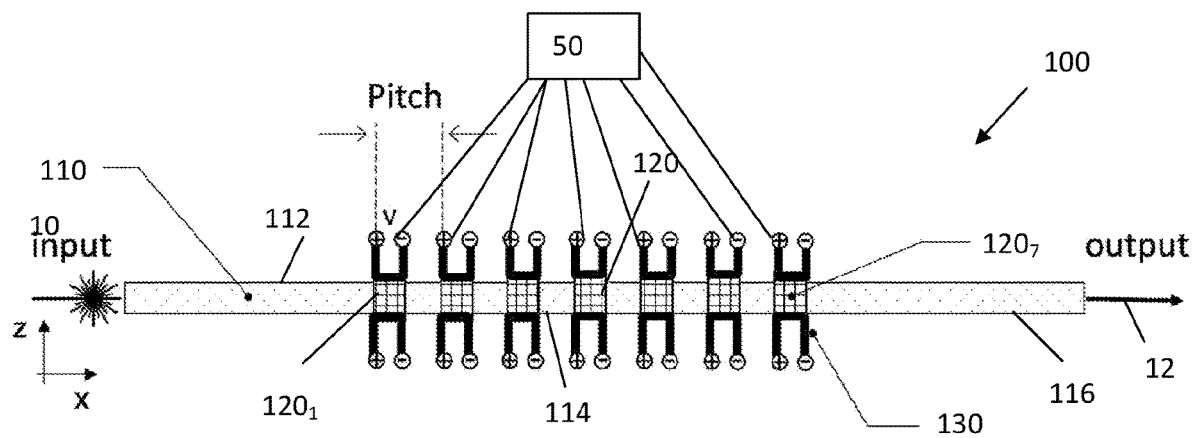
FIG. 1 shows an absorption-based linear device or assembly which can be used as a Low Loss Multi-State Photonic Memory Device.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

Absorption Based Linear Device (FIG. 1)

FIG. 1 shows an absorption-based linear device or assembly 100 which can be used as a transmission based linear Low Loss Multi-State Photonic Memory Device. The multistate device can be utilized for various optical computing applications, for example they may be used as nonvolatile memory devices, components of photonic tensor cores, etc.

As shown in FIG. 1, the linear device 100 may include an optical input port 10, a waveguide 110 such as an optical waveguide, one or more memory cells 120, and an output port 12. In an exemplary embodiment, each of the memory-cells may include thermal heaters such as the U-shaped thermal heaters 130.

The optical input line 10 provides an input light source, such as laser light, which travels into and through the waveguide 110. The waveguide 110 has an input side or end 112, and output side or end 116, and an intermediate portion 114 therebetween. The input line 10 can be aligned with the input end 112 of the waveguide 110 or received within the waveguide 110, to pass light into the waveguide 110. The light from the input 10 travels through the waveguide 110 from the input end 112, through the intermediate portion 114, to the output end 116. The light exits the output end 116 as output 12. The output 12 can be received, for example, by a light detector or light sensor.

The ends 112 and 116 of the waveguide may be connected with other photonic devices. The waveguide ends of device 100 may be seamlessly integrated with the waveguide ends of other photonic devices. The linear device 100 may be connected with other photonic devices, via the ends 112 and 116, and may be integrated into photonic systems including multiple devices, such as the Photonic Tensor Core Matrix Vector Multiplier disclosed in international patent application number PCT/US20/28516.

The memory-cells 120 are linearly arranged along the length of the waveguide 110 and are located at the intermediate portion 114 of the waveguide 110.

The Photonic Memory Cells—Concept Level (Multi-State vs. Binary-State)

The memory cells 120 may be configured to be set in a series of "n" optical states (i.e. S1, . . . , Sn). Each of the "n" states corresponds to the cell causing certain change upon light passing through the cell. For example, when the memory-cell 120 is in state S1 the cell may transmit a fraction T1 of the light passing through the cell and may causes a phase-shift P1 to the light wave passing through the cell and when the memory-cell is in state Sn the cell may transmit a fraction TN of the light passing through the cell and may causes a phase-shift Pn to the light passing through the cell. In an exemplary embodiment, to each of the states S1 to Sn corresponds a different transmission level T1 to Tn (e.g. T1>T2> . . . >Tn), thereby the optical signal transmission levels T1 to Tn determine the optical state of the memory-cells 120. The transmissions T1 to Tn are defined as the fraction between the intensity of light exiting the cell and the intensity of the light incident upon the cell and are thereby numbers between zero and one. The output light intensity of a cell assumes "n" states depending on the transmission state of the cell (i.e. I1=I-in ×T1; I2=I-in ×T2; . . . In=I-in ×Tn, wherein "I1" to "In" are the output light intensity states). It is noted here that the transmission levels of the memory cells may be alternatively expressed via absorption levels A1 to An of the cells, wherein A1=1−T1; A2=1−T2; . . . An=1−Tn.

In another exemplary embodiment, to each of the states S1 to Sn corresponds a different optical phase-shift P1 to Pn (e.g. P1>P2> . . . >Pn), thereby the phase-shift levels P1 to Pn determine the optical state of the memory-cells 120.

Memory-cells having more than 2 states (e.g. 10 states) will be referred hereinafter as multi-state cells whereas memory cells having only two states will be referred as binary cells.

In an exemplary embodiment, the cells 120 are binary-cells each having a first state (S1) corresponding to a light transmission level T1 and a second state (S2) corresponding to a light transmission level T2. In state S1 (may be referred hereinafter as unobstructed state or "ON" state), the cell permits the signal (here, the optical signal provided by the optical input 10) to pass through the waveguide (here, an optical waveguide) substantially unobstructed. Thereby in state S1 the transmission level T1 may be essentially equal to or close to "1" and the intensity of the output light signal I-out is essentially equal with the intensity of the input light signal I-in (i.e. I-out=I-in ×T1, where T1 is substantially equal to "1"). In state S2 the transmission level T2 is substantially lower than T1 and substantially lower than 1. In state S2 (also referred hereafter as an obstructed state or OFF state), the cell 120 at least partially obstructs the signal so that the output light signal intensity is substantially lower than the input light signal intensity (I-out=I-in ×T2, where T2 is substantially smaller than 1 such as 0.86 or 0.75).

The Phase Change Materials (PCM)

The memory cells 120 may include phase change memory materials (PCM), such as: GSST, the materials described in disclosed in U.S. Patent Pub. No. 2020/0285083; the materials described in journal article "Phase change materials in photonic devices", by Gong et. al published in the Journal of Applied Physics 129, 030902 (2021)) and references therein; the materials described in journal article "Broadband transparent optical phase change materials for high-performance nonvolatile photonics" by Zhang et. al. published in Nature Communications 10, article no. 4279 (2019) and references therein; and "Photonic tensor cores for machine learning" by Miscuglio et. al. (Applied Physics Reviews 7, 031404, (2020)) and references therein. The entire content of the above references are hereby incorporated by reference.

The optical properties (e.g. absorption coefficient "k" and refractive index "n") of the PCM memory material changes when the PCM crystalline structure is changed between amorphous to crystalline, as shown in Table 1 below.

TABLE 1

| Material | AMORPHOUS | | CRYSTALLINE | | |
| --- | --- | --- | --- | --- | --- |
| | n | κ | n | κ | FOM |
| GST225 | 4.690 | 0.192 | 8.027 | 1.882 | 1.774 |
| GSS1T4 | 4.725 | 0.208 | 7.704 | 1.464 | 2.035 |
| GSS2T3 | 4.800 | 0.220 | 7.059 | 1.444 | 1.565 |
| GSS3T2 | 4.192 | 0.056 | 6.800 | 1.049 | 2.485 |
| → GSS4T1 | 3.325 | 0.001 | 5.083 | 0.350 | → 5.02 |
| → GSSe225 | 3.150 | → 0.0002 | 3.581 | 0.138 | 3.131 |

Embodiments of Memory Cells 120

The memory cells 120 may be implemented via several alternative embodiments, as explained hereinafter, function of parameters such as: (1) the number of states the memory cell can assume (e.g. binary cell or multi-state cell); (2) the writing/heating mechanism (e.g. electro-thermal heating or laser heating); (3) the type of optical parameter affected by writing and used in reading the state of the cell (i.e. cells using variations in optical transmission; cells using variations in the optical phase of the signal/variation in optical path length of the cell); (4) configuration of the cell, such as position of electrical heaters; (5) The use of plasmonic antenna to focus light on the cell.

Binary Cells Employing Variations in "Optical-Transmission/Absorption"

In one embodiment, the PCM cells 120 are binary cells assuming two states ("0" and "1"). Each PCM cell 120 has a crystalline state and an amorphous state. In the amorphous state (may be referred hereinafter as "a" state), the PCM cell 120 is essentially transparent to allow all light in the waveguide 110 to pass through, which corresponds to the unobstructed state and a transmission Ta which is almost equal to "1" (e.g. Ta=0.999). In the crystalline state (may be referred hereinafter as the "c" state), the PCM cell 120 is opaque to at least partially block some of the light passing through the waveguide 110, which corresponds to the partially obstructed state and a transmission Tc which is substantially smaller than 1 (e.g. 0.86). The partially obstructed "c" state can, for example, reduce the amount of light (e.g. intensity of light) that passes each particular PCM cell 120 by a few dB depending on its length. For example, with reference to FIG. 1, if the first PCM cell $120_1$ is in the obstructed "c" state the transmission Tc may be approximately 0.86, and the cell will reduce incident light intensity passing through the waveguide 110 by 14%, so that the light in the waveguide that passes through to the second PCM cell 120 is about 86% of the light intensity at input 10. The PCM cell 120 can have a default setting that is either the crystalline state "c" or the amorphous state "a".

It is important to note that all PCM materials have both an amplitude and phase change as they are switched (from amorphous to crystalline and from crystalline to amorphous). However, a linear device (e.g. such as the linear device in FIG. 1) only 'uses' the amplitude portion, while an interferometric scheme (e.g. the ring and MZI at FIGS. 2, 3) use the phase portion.

Binary Cells Employing Variations in Optical-Phase-Shift/Optical-Path-Length

In one embodiment, a binary cell (e.g. cells 220 and 320 in FIGS. 2, 3) may include a PCM material configured for use of optical-phase-shift as the parameter storing the "0" and "1" states of the cells. In the amorphous "a" state, the PCM amorphous material may have a refraction index N1. Consequently, the PCM cell 120 may have an optical length L1, corresponding to the refraction index N1, and may insert a phase shift of P1 to the light transmitted through the cell. In the crystalline state "c", the PCM crystalline material may have a refractive index N2. Consequently, in the "c" state the PCM cell 120 may have an optical length L2, corresponding to the refractive index N2, and may insert a phase shift of P2 to the light transmitted through the cell, wherein L2 is different from L1 and P2 is different from P1.

The PCM material and the cell 120 may be configured such that the transmission T1 of the cell in state "a" and the transmission T2 of the cell in state "c" are as close to "1" as possible and as equal to each other as possible. The state ("i" or "0") of the cell 120 may be read by measuring the phase shift of the light at the output of the cell. The state "1" and "0" of the cell 120 may be read by detecting the shift in optical-phase between the input light and output light. If the detected optical-phase corresponds to a P1 optical shift, then the cell 120 is in the "a" state. If the detected optical-phase corresponds to a P2 optical shift, then the cell 120 is in the "c" state.

Embodiments Using Thermal Heaters

One or more thermal heaters 130 are associated with the PCM cells 120 so that each of the discretized PCM cells 120 can be separately and selectively heated. As shown, two heaters 130 are connected to each PCM cell 120. In one embodiment, each heater 130 has a first end that forms a positive terminal, a second end that forms a negative terminal, and an intermediate portion that connects the first end and the second end. A voltage differential is supplied across the positive and negative terminals to produce a current that generates heat at the intermediate portion of the heater 130. The heater 130 can be formed by a thin wire to provide uniform heating across the entire PCM cell 120 to provide that the PCM cell 120 is reliably and uniformly in the crystalline and amorphous state.

The heaters 130 are utilized to change the phase of the associated PCM cell 120 from crystalline to amorphous and from amorphous to crystalline. The variation of the film crystalline structure (from "c" to "a" or from "a" to "c") modifies the optical properties of the associated PCM cell and varies the amount of light absorbed by the associated PCM cell 120. The "a" state is optically the lower loss state, and has also a lower optical index, whereas the "c" states is the optically higher loss states and has a higher optical index.

As noted above, each PCM cell 120 in the array can be individually programmed. Specifically, each PCM cell 120 can be programmed to store either a logic 1 or 0 by changing the phase of the PCM cell 120 to amorphous or to crystalline. That is, all PCMs have both an amplitude and phase change as they are switched (from "a" to "c" and from "C" to "a").

However, a linear device (FIG. 1) only 'uses' the amplitude portion, while an interferometric scheme (ring or MZI, FIGS. 2, 3) use the phase portion. Thus, the PCM cells can be individually programmable through electro-thermal writing (or erasing) using the thermal heaters 130 through Joule heating. Writing/erasing is obtained by changing the phase of the individual cells using heat, which produces a variation of the film crystalline structure (crystalline/amorphous) and consequently modifying its optical properties (variation of absorbed light). The memory level 1 or 0 is encoded in the phase-state (amorphous or crystalline) of the phase change cell. The reading mechanism is based on sensing the optical power at the output port, which can assume a discretized level according to the number of PCM cells 120 in the partially obstructed state.

Multi-State Memory Device Based on Linear Assembly 100

The linear device 100 may be used as a Multi-State Memory Device. The linear device 100 may include a plurality of "m" cells 120 linearly arranged on the waveguide (e.g. the linear device of FIG. 1). The cells 120 are cells employing variations in cell's "optical transmission" as the storage parameter. Each of the cells 120 may be set into a state $S(i)$ corresponding to a transmission level $T(i)$. The intensity of the light output at 12 (I-out) may be equal to the product between the intensity of the input light 10 (I-in) and the transmission levels of each of the seven cells on the waveguide (i.e. I-out=I-in $\times T(1) \times T(2) \times \ldots \times T(m)$; where $T(i)$ represents the transmission level of cell "i").

As further illustrated in the example embodiment of FIG. 1, seven cells $120_1$-$120_7$ are provided. The cells 120 are discretized so that they operate independent of one another and each can be controlled to have a different state, i.e., crystalline or amorphous. For example, the first and fourth cells $120_1$, $120_4$ can be controlled to be in the amorphous state "a" having a transmission state of "Ta" which is essentially equal to "1" (e.g. Ta=0.999), and the second, third, fifth, sixth and seventh cells $120_2$, $120_3$, $120_5$, $120_6$, $120_7$ can be controlled to be in the crystalline state "c" having a transmission state Tc significantly lower than "1" (e.g. Tc=0.86).

Thus, using seven PCM cells 120 corresponds to a 3-bit memory having 8 states, namely (1). all of the PCM cells 120 are in the unobstructed "a" state, in which case the output 12 is 100% (not accounting for any loss from the waveguide itself) of the input 10; (2). 6 of the PCM cells 120 are in the "a" state, and one PCM cell 120 is in the "c" state, in which case the output 12 is I-out=I-in ×Tc, where Tc is about 0.86, of the input 10 which is about 86% of the input; (3). 5 of the PCM cells 120 are in the "a" state, and 2 of the PCM cells 120 are in "c" state, in which case the output 12 is about I-out=I-in ×Tc^2, which is about 74% of the input 10; (4) 4 of the PCM cells 120 are in the "a" state, and 3 of the PCM cells 120 are in "c" state, in which case the output 12 is about I-out=I-in ×Tc^3, which is about 64% of the input 10; (5) 3 of the PCM cells 120 are in the "a" state, and 4 of the PCM cells 120 are in the "c" state, in which case the output 12 is I-out=I-in ×Tc^4, which is about 55% of the input 10; (6) 2 of the PCM cells 120 are in the "a" state, and 5 of the PCM cells 120 are in the "c" state, in which case the output 12 is I-out=I-in ×Tc^5, which is about 47% of the input 10; (7) one of the PCM cells 120 are in the "a" state, and 6 of the PCM cells 120 are in the "c" state, in which case the output 12 is I-out=I-in ×Tc^6 about 40% of the input 10; and (8) all of the PCM cells 120 are in the "c" state, in which case the output 12 is I-out=I-in ×Tc^7 which is about 35% of the input 10. Thus, the linear device 100 implements a memory device with 8 states corresponding to the 8 light transmission levels of the linear device (i.e. total transmission of the linear device can be set to be: 1; 0.86; 0.74; 0.64; 0.55; 0.47; 0.40; 0.35). Thus, the light intensity I-out at the output 12 will assume 8 intensity levels corresponding to 100%; 86%; 74%; 64%; 55%; 47%; 40%; and 35% of the input light 10. A light detector disposed at the output 12 of the linear device 100 will be able to read, detect and distinguish between the 8 levels of light intensity at the output 12.

Thus, the light detector or light sensor can determine the information stored by the assembly 100 by measuring a signal corresponding to the light intensity or amplitude at the output 12. Notably, for each of these eight states, it does not matter which of the PCM cells 120 are in a given state. For example, for state (5) above, the 4 PCM cells 120 in the obstructed state can be the first four, the last four, the first, third, fifth and seventh cells, or any other combination of four PCM cells 120. Regardless of the sequence, four PCM cells 120 in the obstructed state will result in the same light intensity (i.e., amplitude) at the output 12. The linear device 100 may include any type of memory cells 120.

Figure 2:
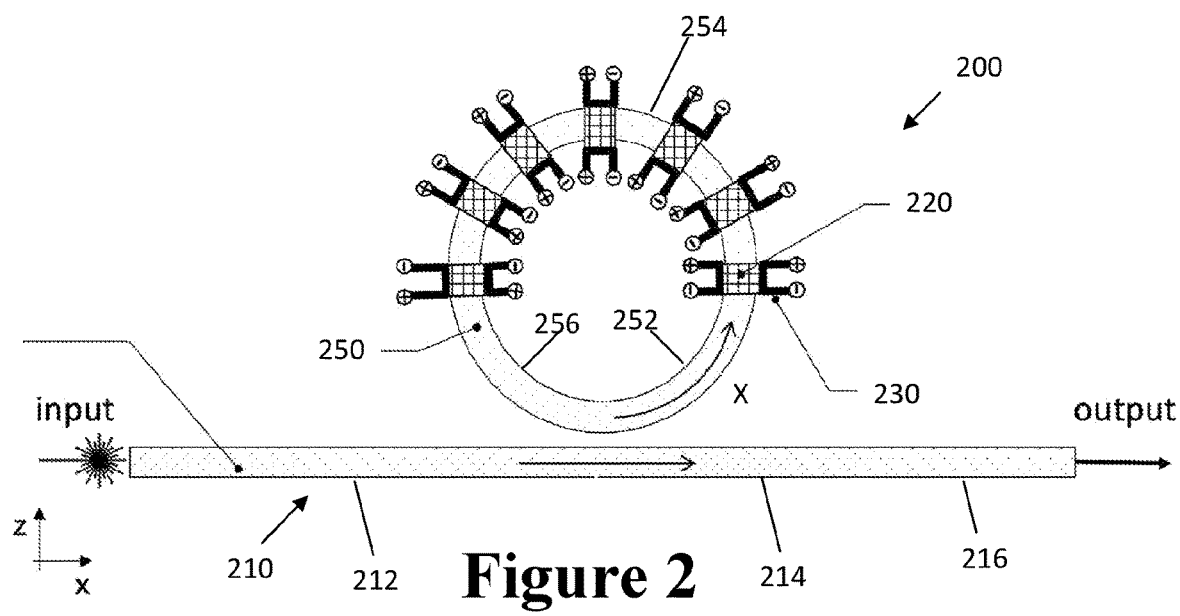
FIG. 2 shows an exemplary embodiment of a phase based Low Loss Multi-State Photonic Memory Device employing a ring cavity.

Multi-State Memory Device Based on Ring Cavity (FIG. 2)

In an exemplary embodiment, a cavity ring memory device 200 is described with reference to FIG. 2. The cavity ring memory device 200 includes an optical ring resonator such as the optical ring resonators described in article "Optical Transmission Characteristics of Fiber Ring Resonators" by Heebner et. al (IEEE Journal of Quantum Electronics, Vol. 40, No. 6, June 2004). The optical ring resonator includes a first waveguide, here a linear waveguide 210, and a second waveguide, here a ring waveguide 250. The first waveguide 210 has an input end 212, an output end 216, and an intermediate portion 214 therebetween. The second waveguide 250 has an input end 252, an output end 256, and an intermediate portion 254 therebetween. The second waveguide 250 is disposed in close proximity with the first waveguide 210 at the intermediate portion 214 such that part of the light traveling through the first waveguide 210 couples into the second waveguide 250 via evanescent field phenomena. The coupling between waveguides 210 and 250 may be controlled such as to obtain the desired light intensities/wave amplitudes in each of the waveguides 210 and 250.

As well known, the ring transmission RT (defined as RT=I(output)/I(input)) of the optical ring cavity at a certain wavelength (λ) depends on the optical-path-length (OPL) of the ring (OPL=$2\pi n_{eff}$, where r is the radius of the ring and $n_{eff}$ is the effective refractive index of the ring material). For example, the transmission RT of the device 200 may be maximum when the optical-path-length of the ring is equal to "mλ" (where m is an integer and λ is the light wavelength) such as to cause constructive interference of the wave in the ring 250 with the wave in the waveguide 210 (e.g. when the phase difference between the 2 waves is a multiple of 2π). Conversely, the transmission RT of the device 200 may be minimum when the optical-path-length of the ring is such as to cause destructive interference (e.g. OPL=(m+½)λ) of the wave in the ring 250 with the wave in the waveguide 210 (e.g. when the phase difference is an odd number of π).

In an exemplary embodiment, the cavity ring memory device 200 further includes one or more PCM cells 220 inserted in the line of the ring waveguide 250 as shown in FIG. 2. The PCM cells 220 may be configured to be set in a series of "n" optical states (i.e. S1, . . . , Sn). To each of the states S1 to Sn corresponds a different optical-path-length L1 to Ln (e.g. L1>L2> . . . >Ln) and a corresponding optical-phase-shift P1 to Pn (e.g. P1>P2> . . . >Pn). Thereby the phase-shift levels inserted by the PCM cells determine the optical state of the memory-cells 220.

In an exemplary embodiment, the PCM cells 220 may assume two states "a" and "c". corresponding to the PCM being in an amorphous state and a crystalline state respectively. To each of the states "a" and "c" corresponds a different optical-path-length La and Lc respectively and a corresponding optical-phase-shift Pa and Pc respectively. Thereby the phase-shift levels (Pa or Pc) inserted by the PCM cells determine the optical state of the memory-cells 220.

The device 200 may include a plurality of "m" cells 220 arranged on the waveguide (e.g. as shown in FIG. 2). The cells 220 are cells employing variations in cell's "optical-path-length" as the storage parameter. Each of the cells 120 may be set into a state S(i) corresponding to a phase-shift P(i). The transmission RT of the ring, and consequently the intensity of the light output at 12 (I-out), depends on the total-phase-shift (TPS) inserted by the "m" cells 220, where TPS=P1+P2+ . . . +Pm, where P1 to Pm take either the Pa value or the Pc value.

In an exemplary embodiment the device 200 may include seven cells 200 linearly arranged on the waveguide, wherein each of the cells may assume two states "a" and "c" corresponding to a phase-shift of Pa and Pc. In this case TPS=P1+P2+ . . . +P7, where P1 to P7 take either the Pa value or the Pc value. Thus, TPS may assume a total of 8 values. Assuming that the cells 220 are configured such that TPS is smaller than $2\pi$ for any combination of cell states, the I-out signal will assume 8 values corresponding to the 8 values of the TPS and the 8 states encoded in the memory device 200. A light detector disposed at the output 12 of the linear device 200 will be able to read, detect and distinguish between the 8 levels of light intensity at the output 12.

The material PCM and the cell 220 may be configured such that the transmission T1 of the cell in state "a" and the transmission T2 of the cell in state "c" are as close to "1" as possible and as equal to each other as possible.

In operation, light (i.e., photons) from the input laser light source 10 travels through the first optical waveguide 210 from the input end 212 and into the intermediate portion 214. Part of the light is then coupled into the input end 252 of the ring waveguide 250 where it travels in the direction of the arrow X to the intermediate portion 254 of the ring waveguide 250, and further to the output end 256 of the ring waveguide 250. The PCM cells 220 selectively alter the phase of the light waves traveling through the ring. Accordingly, the light waves at the output end 256 of the ring waveguide 250 will have a phase that represents the value stored therein, as in FIG. 1.

The light at the output 256 of the ring waveguide 250 is then interferometrically coupled back into the linear waveguide bus 210 at the intermediate portion 214 of the linear waveguide 210, and travels to the output end 216 of the linear waveguide 210. Accordingly, the amplitude/intensity of the light waves at the output end 216 of the linear waveguide 210 is provided by the interference between the two light signals. Some of the first light signal is the light that travels through the linear waveguide 210 from the input 212 to the output 216 without passing into the ring waveguide 250. The second light signal is the light that passes through the ring waveguide 250 and from the output 256 of the ring waveguide 256 back into the linear waveguide 210. Accordingly, the combined light will indicate the value (bits) represented by the PCM cells 220. The PCMs shift the phase resulting in an amplitude/intensity modulation at the output 216 from interference of the ring with the bus 212; whereby the light from output 250 is interferometrically combined with the light at the input 212.

High quality factor of the cavities are allowed in this design since the cells in their amorphous state do not present considerable optical losses. The cavity is in resonance with the reading signal when all the photonic cells are in the 0 state (in the amorphous phase). The data is written electro-thermally by varying the state of the PCM cell via thermal heaters 130 or any other optical mechanism described afterwards. The reading mechanism relies on the variation in transmission caused by the induced shift in resonant frequency of the cavity which partially filters the radiation according to number of written/erased cells.

Figure 3:
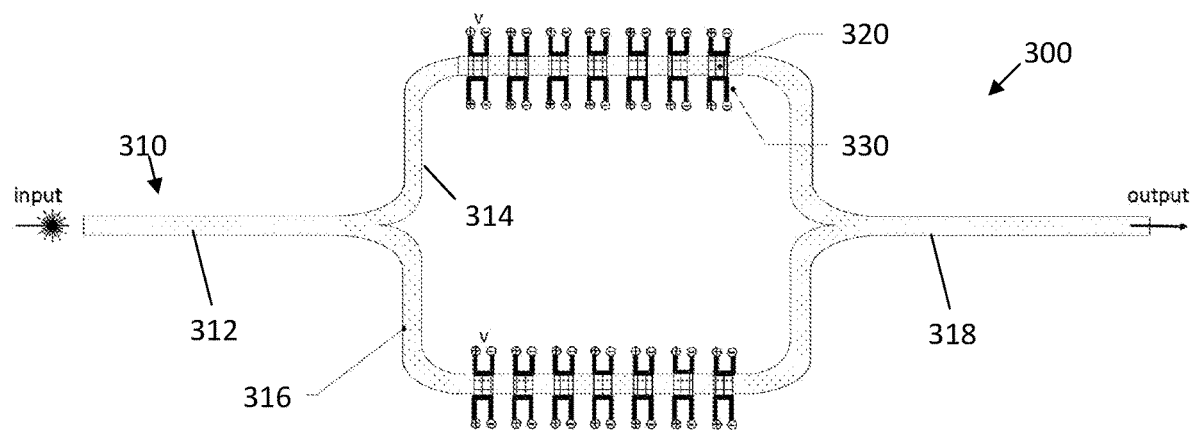
FIG. 3 shows an exemplary embodiment of a phase based Low Loss Multi-State Photonic Memory Device employing a Mach Zehnder interferometer (P-RAM)

Multi-State Memory Device Based on Mach Zehnder Interferometer (FIG. 3)

Turning to FIG. 3, a Mach Zehnder Interferometer (MZI) optical assembly 300 is shown. The assembly 300 has a waveguide 310 with an input end 312, two intermediary arms 314, 316, and an output end 318. The input end 312 of the waveguide 310 splits into the two intermediary arms 314, 316, so that an equal amount of light passes into each of the arms 314, 316. Each arm can have one or more PCM cells arranged thereon, similar to FIG. 1. At least one arm has PCM cells, but both can have cells too.

This device is a classical MZI where the phase shifters on either arm are incorporated via programming cells in the PCMs. Hence, amplitude/intensity modulation is achieved at the output 318 based on the relative phase of the light waves in the combining arms 314 and 316. Thus, where the light waves from the upper arm 314 and the light waves from the lower arm 316 combine into 318 "in phase" (e.g. phase difference is "0") there is constructive interference and the light intensity/amplitude at the output 318 is maximum. Conversely, where the light waves from the upper arm 314 and the light waves from the lower arm 316 combine into 318 "out of phase" (e.g. phase difference is $\pi$) there is negative interference and the light intensity/amplitude at the output 318 is minimum. The phase difference at the junction between 314 and 316 into 318 depends on the optical path difference (OPD) between the upper arm 314 and the lower arm 316 of the MZI. When the OPD is zero or an integer number of wavelengths (e.g. $m\lambda$) the phase difference is "zero" and the waves interferer constructively thereby maximizing the intensity/amplitude of the light output at 318. When the OPD is an integer plus half number of a wavelength (e.g. $m\lambda+\frac{1}{2}\lambda$) the phase difference is "$\pi$" and the waves interferer destructively thereby minimizing the intensity/amplitude of the light output at 318.

In an exemplary embodiment, the arm 314 of the MZI 300 includes cells 320. The cells 320 provide a way to adjust the optical-path-length of the arm 314 in the same way as described with reference to the ring cavity 200. The optical path difference OPD between the upper arm 314 and the lower arm 316 is equal with the difference between the optical-path-length of upper arm 314 and the optical-path-length of the lower arm 316. Since the OPD value determines the light intensity/amplitude of the light output at 318, the nonvolatile state of the PCM cells 320 provide intensity/amplitude modulation at the output 318. In an exemplary embodiment, only the upper arm 314 includes cells 320 whereas the lower arm does not include cells 320. In an exemplary embodiment, both the upper arm 314 and the lower arm 316 include cells 320.

The cells on the lower arm 320 may be used to ensure that the light waves arriving into 318 from the upper arm 314 and the lower arm 316 have amplitudes that are substantially equal to each other (which is a desirable situation).

In one embodiment, FIG. 3 provides electro-refractive reading for preserving phase information without tuners. The scheme comprises a balanced push-pull MZI, in which on both of its arms 314, 316 the PCM cells 320, 322 are deposited in the amorphous condition. To modulate the intensity of the signal at its output, the MZI is kept balanced by thermally writing through thermal heaters 330 the corresponding film deposited both in the "programmable arm" (i.e., PCM switching) and "balance arms" of the MZI. That is, the amplitude/intensity modulation of the MZI is a function of whether (or not) both arms have the same phase and amplitude. If one arm has a lower amplitude than the other (not wanted) then the combiner y-junction is incomplete, even for perfect 180-degree phase difference between each arm (i.e., the arms are unbalanced, which is not desired). A balanced arm is desired. However, since switching the PCMs also introduces and amplitude modulation (which is undesired since it increases insertion loss), key is to ensure that the arms are balanced at all times to get highest signal modulation. The number of written PCM cell corresponds to a specific discretized state (for 3 bits, namely 001=level 1; 010=level 2; . . . 111=level 8).

It is noted that the assemblies 100, 200, 300 have been described as having an output with an amplitude that varies based on the data (ON/OFF state) of the respective PCM cells. However, other suitable arrangements can be utilized. For example, the assemblies 200, 300 operate on a phase modulation basis. In FIG. 2, the light emitted from the ring waveguide 250 can be either phase-aligned or phase-offset with respect to the light passing through the linear waveguide 210. Where the light is phase-aligned, the light combines to form a greater amplitude. Where the light is phase-offset, the light cancels each other to provide a lower amplitude/intensity at the output. Likewise, in the MZI interferometer assembly 300, where the light from the upper arm 314 is phase-aligned with the light from the lower arm 316, the output 318 is greater. And where the light from the upper arm 314 is phase-offset with the light from the lower arm 316, the output is lower. The amplitude and intensity of the light output can be read by a photodetector system. In some embodiments, the phase of the light can be controlled by changing the relative lengths of the arms 314, 316. Any suitable tuning mechanism can be utilized, such as making one arm longer (the phase on that arm is offset from the other arm) or the PCM material can be selected according to a desired phase delay.

Cell Assembly Employing Electrical Heaters

Figure 4A:
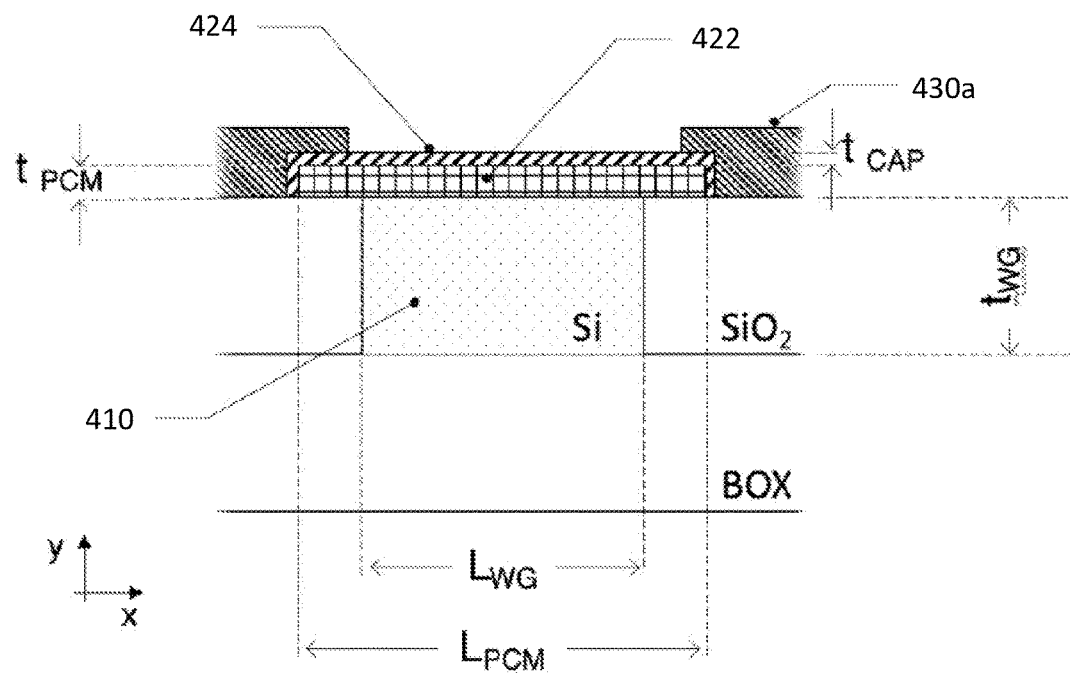
FIG. 4($a$) shows a cross-section of an exemplary embodiment of a memory cell employing an electrical heater for writing/erasing the cell.
Figure 4B:
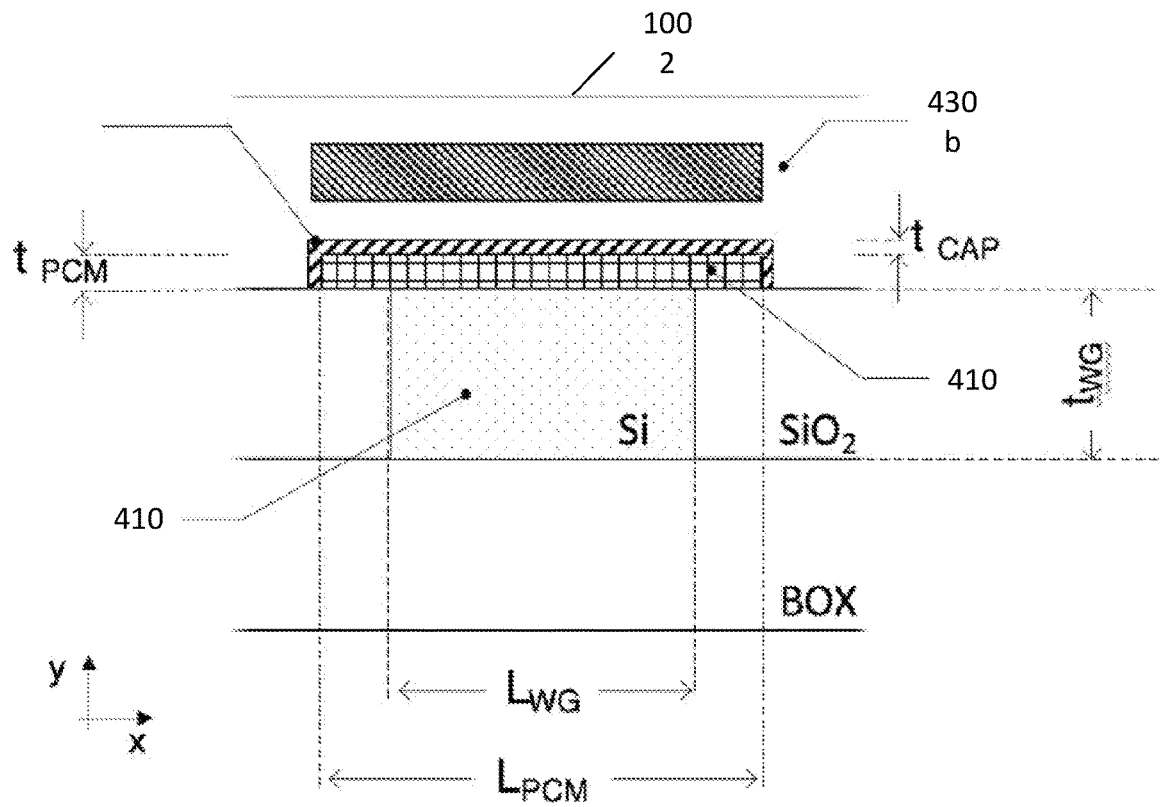
Figure 5A:
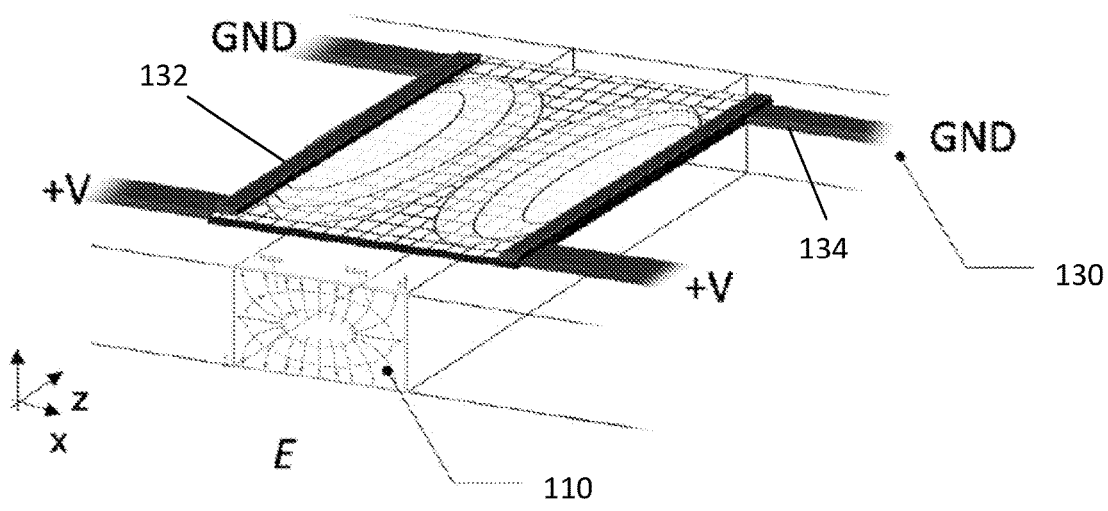
FIG. 5($a$) shows a perspective view of a memory cell employing electrical heaters for writing/erasing the cell and the isothermal lines in the cell.

FIGS. 4(a), 4(b) show two examples of heater-cell assembly configurations, which can be utilized with the PCM of FIGS. 1-3. FIGS. 4(a) and 4(b) show a cross-section view of exemplary memory cell assemblies so that the cross-section cuts perpendicular on the waveguide and the "READ" light beam traveling through the waveguide. FIG. 5(a) shows a perspective view of a heater-cell assembly. In FIGS. 4(a), 4(b), the assemblies each have a waveguide 410, PCM cell 420, and one or more electrothermal heaters 430. In FIGS. 4(a) and 4(b) the light reading the memory state of the cell travels into the waveguide 410 perpendicular to the page. The waveguide core region 410 can be a waveguide structure (e.g. Silicon or Silicon Nitride, or SiO2, or III-V etc.) having square or rectangular cross-section with a flat top surface, flat bottom surface, and a width $L_{WG}$. The PCM 420 includes a first layer 422 that comprises a programmable layer such as a photonic memory element such as a PCM film, and a second layer 424 that comprises a capping layer. The first layer 422 is situated on the top surface of the silicon waveguide 410. As shown, the PCM film 422 is flat with a flat top surface, a flat bottom surface and an elongated rectangular cross-section with a thickness $t_{PCM}$ and a width, $L_{PCM}$. The PCM width, $L_{PCM}$, is greater than the waveguide width, $L_{WG}$, so that the PCM covers an entirety of the width of the waveguide 410. The optical mode of the light beam traveling through the waveguide extends from the waveguide core region into the PCM region, hence the PCM influences the beam/optical mode in phase, amplitude and/or intensity. The state of the PCM (e.g. amorphous or crystalline) determines the optical transmission of the cell and the optical-path-length/phase-change introduced by the cell. The state of the PCM film can be switched between multiple states thereby changing the effect of the cell on the light beam/optical mode. For binary cells the PCM film may be switched between the crystalline and amorphous states. For multi-state cells the PCM film may be switched between multiple crystallization state, such as for example: 100% amorphous; 25% crystalline and 75% amorphous; 50% crystalline and 50% amorphous; 75% crystalline and 25% amorphous; and 100% crystalline.

The PCM material can be GST, alloys of GST, or VO2 or any other phase change material such as 2D materials etc., for example as shown in Table 1 above.

The capping layer 424 may be flat with a flat top surface, flat bottom surface, and an elongated rectangular cross-section with a thickness $t_{CAP}$. The capping layer 424 may cover the top surface and side surfaces of the PCM film 420. The capping layer 424 may provide passivation. The capping layer 424 may protect the PCM film 422 to avoid oxidation (oxide) of the PCM film 422 but more importantly it may prevent the liquid PCM in the amorphous state to physically move. The capping layer 424 may enclose the top and sides of the PCM film 422, and the silicon waveguide and SiO2 may enclose the bottom surface of the PCM film. The capping layer 424 may also contain the liquid PCM in the a state.

FIG. 4(a) provides a lateral configuration. Here, the heater 430a is formed as a block with an overhang forming a ledge at the top of the block. The heater 430a is positioned at each of the two sides of the combined PCM film 422 and capping layer 424, and extend upward from along the sides and extend inward at the ledge to at least partially cover the top surface of the capping layer 6. Though a single heater 430a can be utilized, two heaters 430a provide faster and more uniform heating of the PCM film 422, as shown in FIG. 5(a) (for the heaters of FIGS. 1-4(a)).

FIG. 4(b) provides a vertical configuration. Here, the heater 430b has a rectangular cross-section with a thickness, flat top surface, flat bottom surface and a length that is the same as the capping layer 424 to more fully and uniformly heat the PCM film 422. The heater 430 is positioned on the top surface of the capping layer 424.

The heating elements 430 are tungsten, ITO film or pn junctions. When properly biased, the heating element dissipate energy in the form of Joule heat in the surrounding media. The temperature at which the PCM film reaches the amorphous state is 100's of K (depending on the material used and thickness), whereas for inducing re-crystallization, the PCM needs to be heated above the crystallization temperature (~100's K, typically lower than the amorphization temperature) but below the melting point, for a critical amount of time, thus leading to an asymmetric writing time for writing and erasing. The position and thickness of the heating elements are optimized to minimize the mode overlap with the travelling optical signal, thus minimizing optical losses.

The heating elements have a proximity to the PCM films controlled by a spacer layer. The spacer layer is a non-conductive material such as an oxide, a polymer, or simply air. Its position relative to the heater can be a) either vertically, or b) laterally. Its thickness (i.e. linear distance) impacts the heater's ability to change the PCM's optical properties; i.e. the closer the more efficient. However, if metals are used as heater material and brought in close proximity to an optical waveguide, optical losses may occur. Hence the heater distance (i.e. spacer layer thickness) is an optimization parameter for various application targets.

Figure 5B:
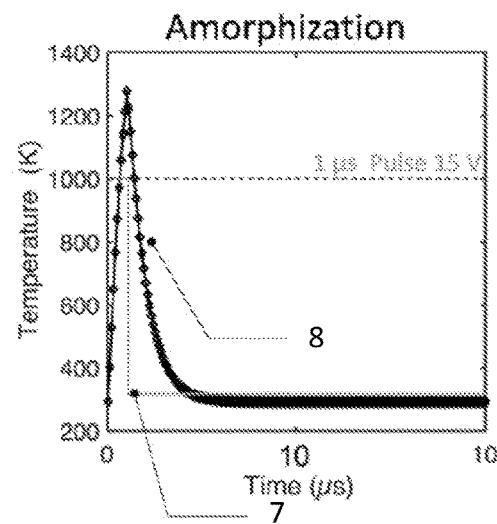
Figure 5C:
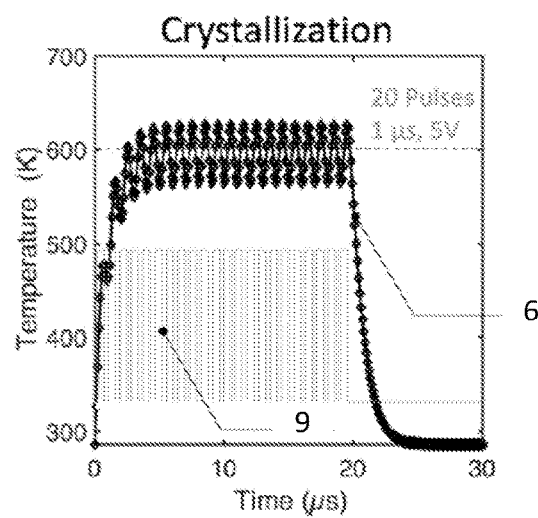

FIG. 5 shows further detail of the electro-thermal switching from crystalline to amorphous (FIG. 5(b)) and vice versa (FIG. 5(c)) through Joule heating in a lateral configuration (i.e., FIG. 4(a)). The average temperature in a PCM film is a function of the heat induced by a rectangular pulse wave (8-10). The amorphization temperature is the melting temperature (for example, say >900K) while the temperature for crystallization (for example, ~523K but below amorphization temperature) is kept approximately constant for 20 μs. Thus, referring to FIG. 5(b), to place the PCM film 422 in an amorphous state, a short 15V pulse is applied to the heater 130, 230, 330, 430 for about 1 microsecond to reach approximately, for example, 1300 degrees Kelvin. FIGS. 5(b), 5(c) also shows the write control pulse 7 (from c to a) and the erase control pulse 9 (from a to c). Referring to FIG. 5(c), to place the PCM in a crystalline state, a series of 20 5-volt pulses is applied to the heater 130, 230, 330, 430, each having a duration of 1 microsecond. FIG. 5(c) also show the PCM response 6 and the voltage control pulse 9.

Four Bit Memory System (FIGS. 6 a-e)

Figure 6A:
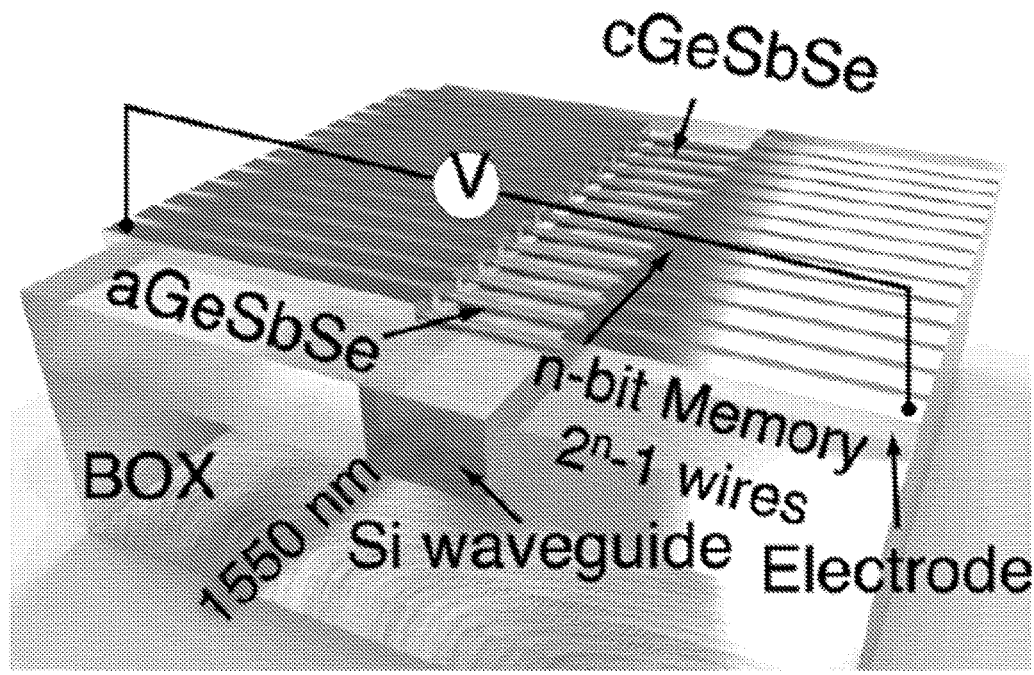
FIG. 6($a$) shows a perspective view of an exemplary embodiment of a transmission based linear 4-bit Low Loss Multi-State Photonic Memory Device.

FIG. 6(a) shows an exemplary embodiment of a 4-bit multistate on-chip reprogrammable photonic memory device. The 4-bit device may include a S1 waveguide and a set of PCM wires (e.g. 15 wires) disposed on top of the waveguide such that the optical modes inside the waveguide interact with the wires. The states of each of the wires can be switched between the crystalline and amorphous phases, thereby switching the transmission of the wires between the Ta and Tc transmissions corresponding to the amorphous and crystalline states (Ta>Tc). As seen in FIG. 6(a) the first five wires may be set into an amorphous state (aGeSbSe) whereas the next ten wires may be set into the crystalline state (cGeSbSe).

Each of the wires may be connected with tungsten electrodes configured to provide heat to the wire so as to switch the wire between the crystalline and amorphous states. The wires may be about 30 nm thin and 250 nm wide Ge2Sb2Se5 wires and may be patterned by using a combination of lithographic processes, sputtering and liftoff. The resulting wire can be contacted with tungsten electrodes which act as heating elements.

Thus, selective 'writing' is achieved by changing the phase of the corresponding number of PCM wires deposited on the waveguides, by local electrostatic heating, which causes crystallization or amorphization, and consequently modifies the waveguide modal refractive index in a reversible process. A n-bit photonic memory of $2n$ states require $2n-1$ wires.

Figure 6B:
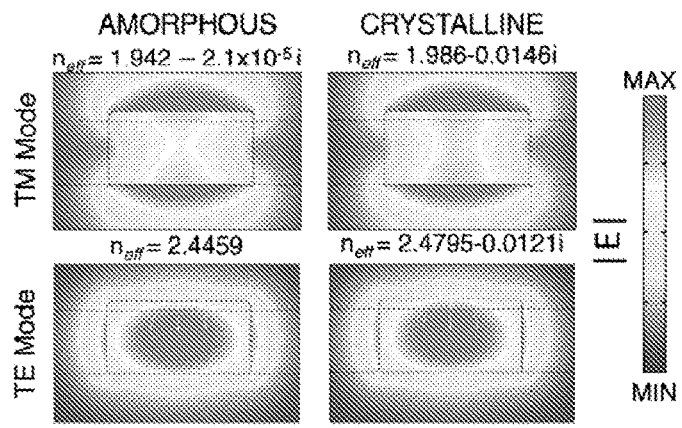

FIG. 6(b) shows a simulated interaction between the Ge2Sb2Se5 nanowire and the fundamental optical modes for both the amorphous (left panel) and crystalline (right panel) state. The fundamental transversal electric (TE) and transverse magnetic mode (TM) profiles are shown (as normalized electric field). The TE and TM modes of the Ge2Sb2Se5-Silicon hybrid waveguide at 1550 nm for amorphous and crystalline state show a strong index (imaginary-part) difference ~0.01, while incurring a relatively low insertion loss.

In an exemplary embodiment, the photonic memory kernels are based on $Ge_2Sb_2Se_5$ since this material presents broadband transparent region for telecommunication wavelengths in its amorphous state and can be used to implement high-performance nonvolatile multistate photonic memories. Ge2Sb2Se5 exhibits 3-orders of magnitude lower absorption coefficient with respect to regularly employed GST at 1550 nm, and features still a high optical (real part) index contrast Dn of 0.5 across the near- to mid-IR bands and around 0.2 Δκ in the C-band. Remarkably, the optical absorption in the amorphous state is vanishingly small and non-measurable when heterogeneously integrated in silicon photonics of ~100 micrometer long lengths. Moreover, the relatively lower variation of the absorption coefficient, indeed, makes it a promising material for multistate devices, avoiding the utilization of high laser power and extremely low noise equivalent power detectors. Assuming a continuous film, for the fundamental TM mode of the waveguide the phase transition produces a variation of the effective absorption coefficient Δ κ~0.01 to which corresponds 0.21 dB/μm.

For the embodiment shown in FIG. 6(a), heat may be applied to the PCM material externally via joule heating of a tungsten metal layer in contact with the wire. Different pulse train profiles, according to the type of transition (a-c or c-a), are applied to the wire. The material choice for the electrodes, their placement with respect to the waveguide and the propagating mode are opportunely engineered to minimize the insertion losses while providing efficient thermal energy. This is possible because the metal of choice (tungsten, W) has superior thermal properties without being affected by high optical losses such as in plasmonic noble metals. Moreover, the periodicity and intensity of the electric pulses applied to the tungsten electrodes, used for writing the memory, has to be adjusted for providing sufficient thermal energy to Ge2Sb2Se5 wire according to the phase in which the wire needs to be switched. The voltage, number of pulses and periodicity can be regulated to i) heat up the PCM wire up to 250° C. and anneal for few tens of micro seconds to crystallize it ii) melt it, increasing the temperature to over 600° C., for the amorphization. A resistive heater optimized for efficient switching and not generating insertion losses can also be made in doped silicon or in silicide, ITO or graphene electrodes.

Figure 6C:
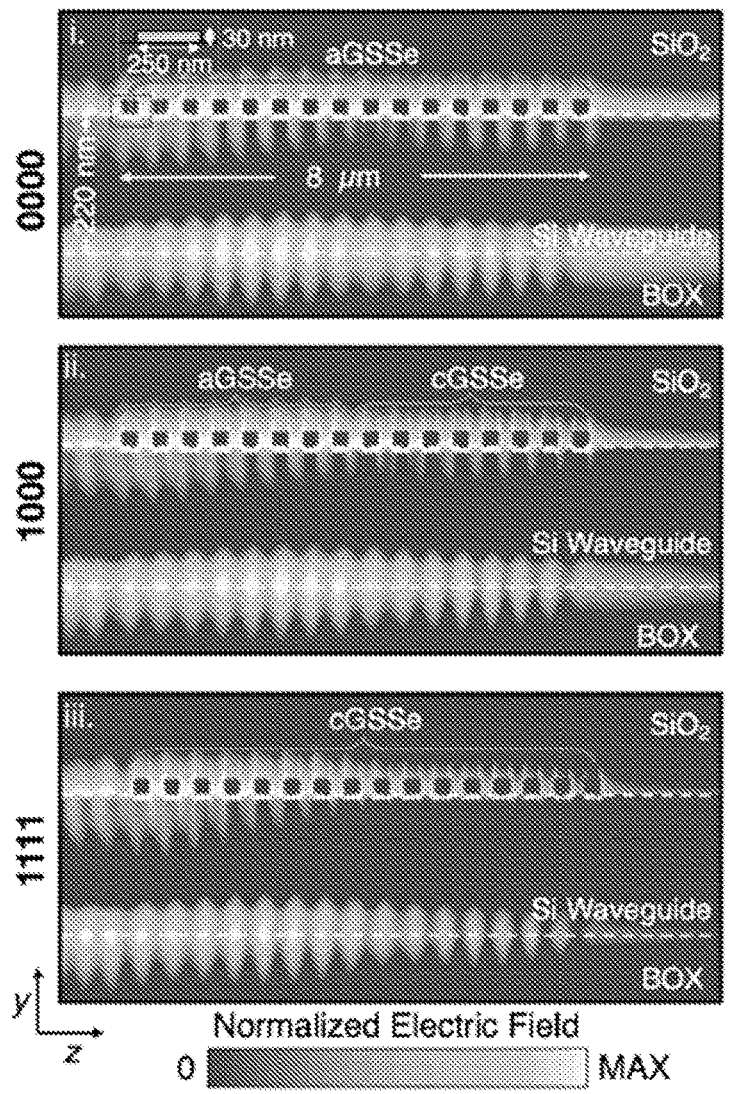

FIG. 6(c) shows a side view of the normalized distribution of the electric field, obtained by simulations, in a 4-bit multistate on-chip reprogrammable photonic memory, such as the one in FIG. 6(a). Specifically, FIG. 6(c) shows the normalized electric field in the yz plane of a propagating wave (TM mode) for different digital states (from up to bottom '0000', '1000' and '1111'). The 0000 state is considered the less lossy state and 1111 to be most lossy (i.e., optically absorbing). Dashed lines represent top and bottom waveguide surfaces. The row of dark squares represents the wires. Dimension of waveguides and the GSSe wire are shown on the figure depicting the state 0000 (i.e. length of the 4-bit memory is about 8 microns whereas height of the waveguide is about 220 nm). As seen in FIG. 6(a) for state 1111 the normalized electric field at the output of the fiber is clearly smaller than the normalized electric field at the output of the fiber for state 0000.

In the linear device at FIG. 6(a), the state of the 4-bit multi-state photonic memory is provided by the number of PCM cells in amorphous state and crystalline state. The 0000 state is where all of the PCM cells are in the unobstructed "a" state, so that the most light gets passed from the input to the output; whereas the 1111 state is where all of the PCM cells are in the partially obstructed "c" state, so that the least amount of light passes from the input to the output.

Figure 6D:
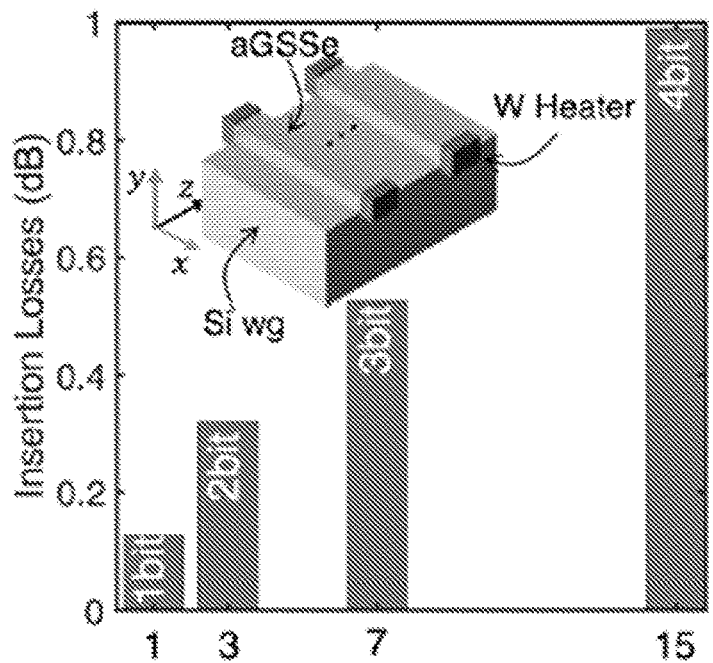

FIG. 6(d) shows the insertion losses considering arrays of different number of wires of amorphous GSSe, which represents insertion losses of photonic memory of different states: 1 PCM bar/wire=2 states (1-bit); 3 PCM bars/wires=4 states (2-bit); N bars/wires=N+1 states (Log 2(N+1) bits). The insertion losses include both the insertion losses due to the absorption in the PCM and the insertion losses in the tungsten electrodes used to Write/Erase the photonic memories.

Figure 6E:
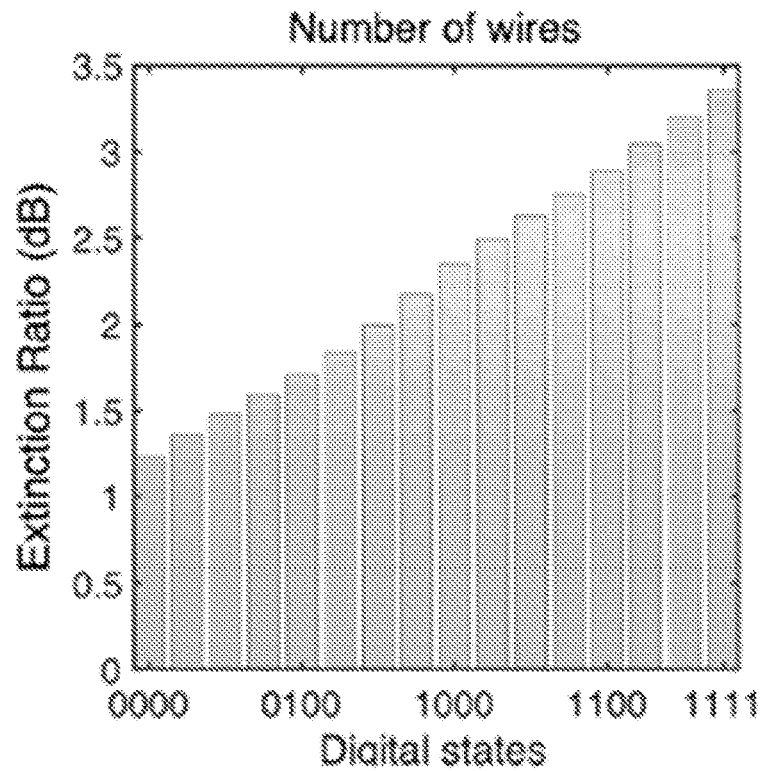

FIG. 6(e) shows the extinction ratio (ER) for a 4-bit photonic memory as function of digital states and the number of wires. As seen, for an increased number of crystalline-wire the extinction ratio increases. For the state 0000 the extinction ratio is about 1.25 dB whereas for the 1111 state the extinction ratio is substantially larger, about 3.3 dB.

The Controller

Figure 8:
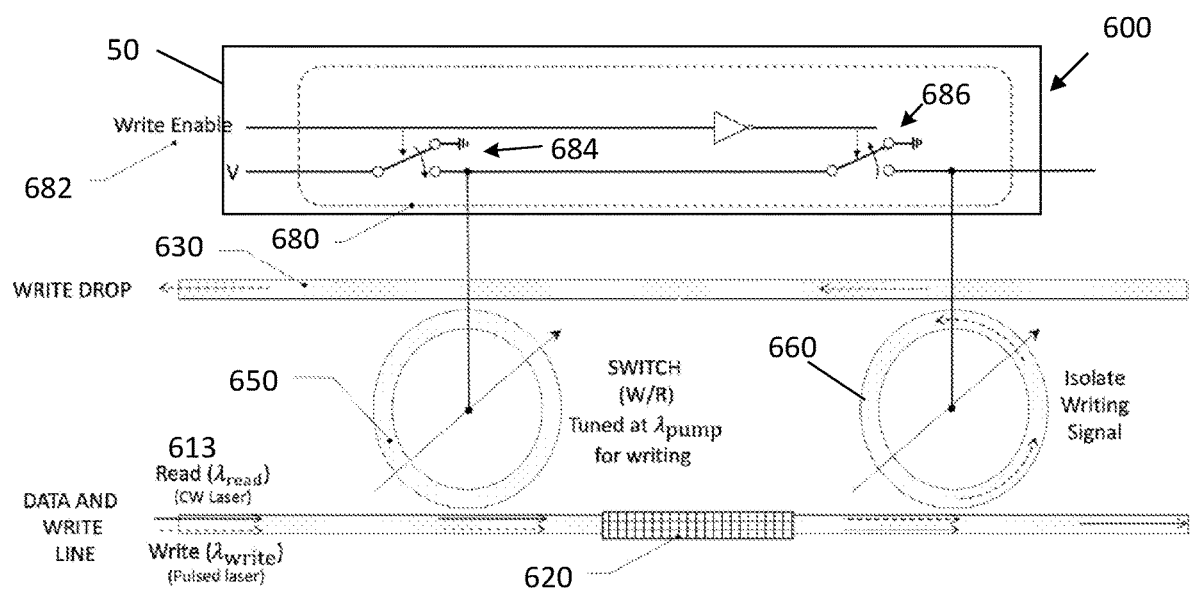
FIG. 8 shows a nonvolatile Low Loss Multi-State Photonic Memory Device where the Read/Write beams are delivered through the same waveguide.

As shown in FIGS. 1, 8, a controller 50 is provided to separately control operation of each of the heaters (e.g., by selectively applying (turning ON/OFF) a voltage to the heater), and has several operating modes including a writing operation mode, reading operation mode, and erasing operating mode. At the outset, all of the PCM cells 120 can be placed into a crystalline state by placing the entire assembly device 100 into an oven to heat the PCM cells 120 a predetermined length of time; or, the controller 50 can operate in the erase mode by applying the pulse of FIG. 5(*c*) to the heaters 130 associated with all of the PCM cells 120$_1$-120$_7$. The controller can be, for example, a processor or other processing device and can have a storage device to store information and be operated by software.

The PCM cells 120 will stay in that crystalline state, even as the assembly 100 returns to room temperature. The controller 50 can then implement a writing operation, whereby at room/environmental temperature the controller 50 separately controls the heaters 130 associated with selected PCM cells to move those to the amorphous sate. For example, the controller can apply the pulse of FIG. 5(*b*) to the heaters 130 associated with one or more of the PCM cells 120, such as the first and third PCM cells 120$_1$, 120$_3$, which moves the first and third PCM cells 120$_1$, 120$_3$ to the amorphous state. The second, and fourth through seventh PCM cells 120$_2$, 120$_4$, 120$_5$, 120$_6$, 120$_7$ will remain in the crystalline state. The controller 50 selects which PCM cells 120 to move to the amorphous state based on the desired information to be written to the memory 100, such as which bits are to be stored in the memory 100. The PCM cells 120 remain in the crystalline and/or amorphous state until they are changed to a different state. Accordingly, the memory 100 is nonvolatile.

In an exemplary embodiment, in the reading operation state, a light sensor or light detector may receive the light at the output end of the waveguide. The light detector can measure the light intensity (i.e., amplitude) and/or phase and provide that information to the controller 50. The controller 50 can then analyze the detected output light signal to determine the data stored in the memory. That is, the light intensity is indicative of the state of the PCM cells 120 (as either being crystalline or amorphous), and the number of cells in the unblocking and partially blocking states is representative of the data stored, for example with the crystalline state representing a value 1 and the amorphous state representing a value 0.

In another exemplary embodiment, in the reading operation state the light at the output of a waveguide may be directed to other photonic devices, such as photonic devices performing computing operations (e.g. additions, multiplications, digital to analog conversions, etc.).

Figure 7:
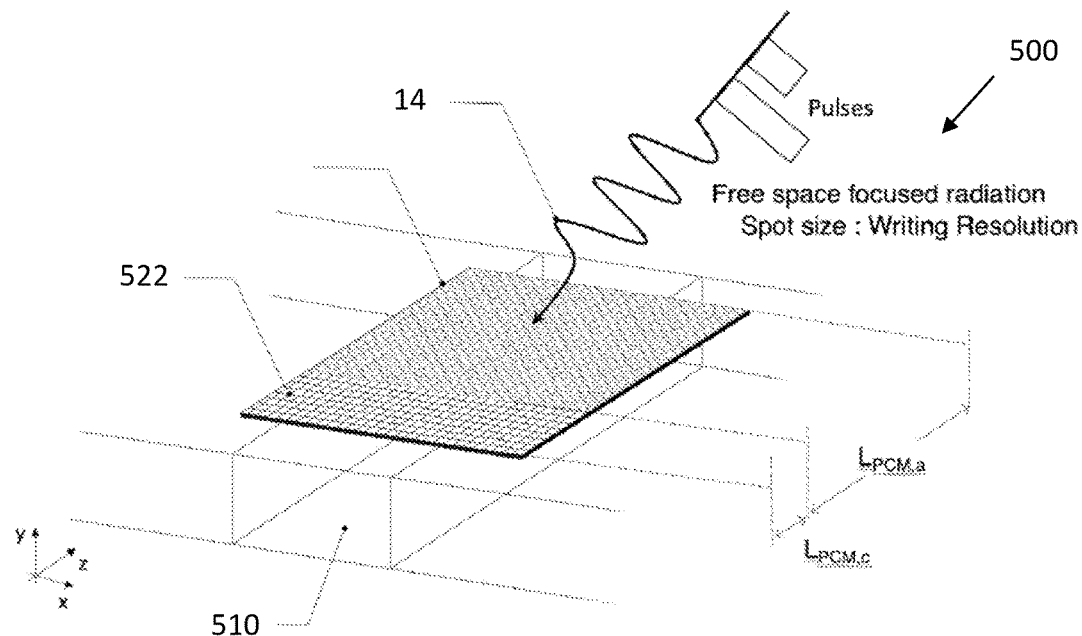
FIG. 7 shows an integrated all-optical nonvolatile Low Loss Multi-State Photonic Memory Device.

Multi-State all-Optical Memory Cell (FIG. 7)

FIG. 7 shows another embodiment of the disclosure having an integrated all-optical nonvolatile memory cell 500 based on PCM material. FIG. 7 shows an optical memory cell 500 which can be integrated in devices at FIG. 1, 2, 3 as memory cell elements 120, 220 and 320. The memory cell 500 may include a PCM layer 522 disposed over a waveguide 510. The states of the memory cell 500 may be written via a laser beam 14 and may not require electro-thermal writing via electrical heaters. The memory cell 500 can be configured to be a multi-state/deep-state memory cell which can be set into more than two states (e.g. can be set into 4, 8 or 16 states) by selectively setting various portions of the PCM into amorphous ("a") or crystalline ("c") state.

In an exemplary embodiment, the laser beam 14 may be focused on a certain first-portion of the PCM layer 522 (e.g. the portion shown in FIG. 7 as having a length $L_{PCM,c}$), thereby heating the first-portion such as to set that portion to the crystalline phase. Then, the laser beam may be focused on a second-portion of the PCM layer 522 (e.g. the portion shown in FIG. 7 as having a length $L_{PCM,a}$), thereby heating the second-portion such as to set the second-portion to the amorphous state. This way, the PCM layer 522 may be set to have multiple crystallization states, such as for example: (1). 100% of PCM layer is in "a" state; (2). 25% of PCM layer 522 is in "c" state whereas the remaining 75% is in "a" state; (3). 50% of PCM layer 522 is in "c" state whereas the remaining 50% is in "a" state; (4). 75% of PCM layer 522 is in "c" state whereas the remaining 25% is in "a" state; (5). 100% of PCM layer is in "c" state. The PCM material and the cell 500 is configured such that each of the above 5 crystallization states (i.e. S1 . . . S5) leads to a different optical transmission (i.e. T1 . . . T5) and/or phase-shift (i.e. P1 . . . P5) of the memory cell 500. Thus, a READ optical signal traveling through the waveguide may see 5 different levels of optical absorption/phase shift corresponding to the 5 states of the memory cell 500.

The number of states which can be written on a the PCM layer 522 by the laser beam 14 is limited by the writing resolution of the laser beam (i.e. the spot size of the laser beam). The smaller the spot size the more PCM portions can be switched between "a" and "c" and the more states can be written on the cell 500.

This embodiment utilizes radiation (e.g. laser beams) to alter one or more portions of a PCM cell into crystalline and/or amorphous state, and does not have the heaters that are used in FIGS. 1-6. The pulse 14 is an optical pulse that heats the PCM, such as from a modulated laser or continuous power laser with an EO modulator. The pulse 14 is unlike the control pulse of FIG. 5, which is an electrical control pulse that controls the heater. The pulse 14 may be used to switch the state of a certain portion of the PCM layer 522 between "a" and "c" states thereby writing information to the programmable PCM layer. In one embodiment, the PCM layer 522 is enclosed in a capping layer.

While FIG. 7 shows a laser beam/pulse coming from free space it is understood that the laser beam/pulse can be delivered on the PCM layer 522 via a fiber or a waveguide. Thus, the writing and erasing operations of the memory cell 500 is achieved by the laser pulse 14 which selectively locally modifies the material phase of a continuous film/layer from its initial state. Optical writing/erasing resolution using free-space writing mechanism is given by the laser spot size. In one example embodiment, the spot size covers substantially the entire PCM layer (if the entire PCM is switched as a whole (from 0 to 1).

Add/Drop Memory Device Employing In-Line Writing (FIG. 8)

Turning to FIG. 8, an integrated all optical writing assembly 600 for multilevel photonic memories is shown as an add/drop filter. The assembly 600 has a first optical linear waveguide 610, a second optical linear waveguide 630, an array of one or more PCM cells 620, one or more ring waveguides here shown as a first optical ring waveguide 650 and a second optical ring waveguide 660, and a controller 50 that includes a logic circuit 680. The logic circuit 680 has a write enable line 682 that operates a first switch 684 to selectively connect with the first resonator 650 and a second switch 686 to selectively connect with the second resonator 660. The ring waveguides 650, 660 are positioned between the first linear waveguide 610 and the second linear waveguide 630. In one embodiment, the first linear waveguide 610 is parallel to the second linear waveguide 630.

The first waveguide 610 is utilized as a data and write line in which both the Read signal 613 and the Write (Erase) signal 611 are traveling. The write signal 611 may be a pulse from a laser that can write/erase the photonic memories by changing the phase of a PCM film comprised by PCM cells 620, wherein the PCM film is placed on top of the waveguide 610. The PCM cell 620 is disposed on the waveguide between the two ring resonators 650, 660. The resonance frequency of the ring resonators can be electrically tuned for dropping the writing signal 611, on the second waveguide 630, according to an electrical signal ('Write Enable' 682) and related logic circuitry 680.

The resonance of the first ring 650 may be adjusted to filter out the Write beam/signal (having a wavelength $\lambda_{write}$) from the first waveguide 610 and to drop it on the write drop waveguide 630, so that the PCM cells 620 do not receive the write signal. Conversely, the resonance of the ring 650 may be adjusted to enable the Write beam/signal to move through the waveguide 610 into the cells 620 to Write data to the PCM cells 620. The resonances of the rings 650 and 660 may be controlled via switches 684 and 686 respectively.

The resonance of the first ring 650 may be adjusted to filter out the Read beam/signal (having a wavelength $\lambda_{read}$) from the first waveguide 610 and to drop it on the second linear waveguide 630 so that the cells 620 do not receive the read signal. Conversely, the resonance of the first ring 650 may be adjusted to enable the Read beam/signal to move through the waveguide 610 into the cells 620 and further, so that data can be Read from the PCM cells 620.

The resonance of the second ring 660 may be adjusted to filter out the Write beam/signal from the first waveguide 610 and to drop it on the write drop waveguide 630. This can be useful, for example, when the waveguide 610 is integrated with other optical components (e.g. other PCM memories, performing additions, multiplication etc.), thus downstream from the PCM 620 may be other optical components (e.g. memories), so that the Write beam only writes to the PCM 620 and not to get through to the components/memories downstream from the cells 620. That essentially isolates and gets rid of the Write signal downstream from the cell 620, such that the drop waveguide 630 acts as a "dump" for unwanted laser beams. Conversely, the resonance of the second ring 660 may be adjusted to filter the Write beam/signal to move through the waveguide 610.

The resonance of the first ring 650 may be adjusted such as to enable Read beam/signal to move through the waveguide 610 while filtering out the Write/beam signal, to apply the Read signal to the cells 620. The resonance of the second ring 660 may adjusted such as to enable Read beam/signal to move through the waveguide 610 while filtering out the Write/beam signal (having a wavelength $\lambda_{write}$ which is different from $\lambda_{read}$), to read the data from the cells 620. The resonance of the ring 660 may be adjusted to filter out the desired light from the first waveguide 610 (e.g. the Write signal) and to drop it on the write drop waveguide 330.

Accordingly, there is at least a Write operating mode in which the first ring 650 filters the Read signal and allows Write signal to pass to 620, and a Read operating in which the first ring 650 filters the Write signal and allows the Read signal to pass. In addition, there can be a Write dump operating mode in which the second ring 660 dumps the Write signal to remove unwanted laser beams/signals to avoid them from travelling downstream. Other operating modes can also be provided, such as the second ring 660 filtering the Read signal.

The PCM cells may be set in a plurality of "n" states S1 to Sn such that the transmission of the PCM cell 620, at the wavelength $\lambda_{read}$ of the Read signal, assumes "n" levels (e.g. T1($\lambda_{read}$) to Tn($\lambda_{read}$)). Thus, when the state of the PCM cell is read via the Read laser beam, the intensity of the signal at the output of waveguide 620 will assume n states ($I_1 = I_{read} \times T1(\lambda_{read})$; $I2 = I_{read} \times T2(\lambda_{read})$; . . . ; $I_n = I_{read} \times Tn(\lambda_{read})$, wherein $I_{read}$ is the intensity of the read beam at the input of the waveguide). The reading mechanisms (i.e. sending light through the PCM cells and reading the optical state, encoded by the optical properties of the PCM, onto the waveguide beam) rely on transmission of the reading signal, at the different frequency with respect to the ring resonators, modulated by the optical absorption of PCM materials.

FIG. 8 is particularly useful (e.g., over FIG. 7) to program the memory element by using signals inside the waveguide, as opposed to shining light from free-space onto the chip. Both WRITE and READ laser beams travel inside the same waveguide 610, shown in the figure as separated by wavelength ($\lambda_{write}$ and $\lambda_{read}$). Hence each ring can be spectrally tuned to a specific wavelength for programming and/or read-out. The write signal is isolated to avoid crosstalk between the various spectral channels. This enables separate memory operation (separate WRITE/ERASE/READ) between the various memory-rings, which allows for higher information density via WDM multiplexing.

Figure 9:
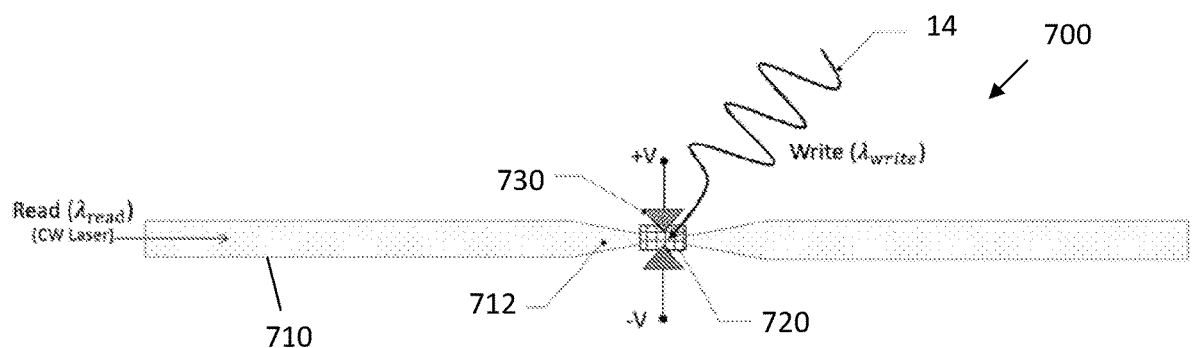
FIG. 9 shows a Low Loss Multi-State Photonic Memory Device employing a plasmonic enhanced writing/reading mechanism.

The Plasmonic Enhanced Writing/Reading Mechanism has a PCM (FIG. 9)

FIG. 9 shows a multi-state photonic memory device employing a plasmonic enhanced writing/reading mechanism. FIG. 9 also shows an assembly 700 for enhancing the laser pulse 14. The plasmonic enhanced writing/reading mechanism has a PCM cell 720 deposited on a waveguide 710 in between a plasmonic nanoantenna 730 resonant at the optical writing signal. In the example shown, the antenna 730 is a bow-tie antenna with a single frequency and one or more antenna. A narrowed region is provided at a section of the intermediate portion of the waveguide 710. The narrowed region includes a narrowed center section that tapers outward at its sides. That is, in the example embodiment of FIG. 9, the input portion of the waveguide 710 is tapered inward to the narrowed center, then the narrowed center tapers outward to the output portion of the waveguide 710. The PCM cell 720 is positioned on the waveguide 710 at the narrowed center section of the tapered section 712 of the waveguide. The nanoantenna 730 is positioned at the top and bottom of the PCM cell 720, and a pulse 14 is received at the PCM cell 720.

Optical write/erase are performed via delivery of optical laser pulses through an integrated waveguide; or alternatively off-chip by the pulse 14 in free space. Reading happens through optical absorption provided by PCM cell 720 which delivers signal modulation. The heat source for write/erase operations can be achieved via plasmonically enhanced light-matter interaction using an optical nanoantenna 730 either off-chip using free space signal or integrated writing signal travelling within the waveguide. For engineering the mode overlap between the photonic mode and plasmonic resonance an adiabatic compression is used by tapering 712 the waveguide. The waveguide can be tapered, for example, since the plasmonic section has a different impedance than the input section 710. The taper reduces mismatching and hence reduces insertion losses (e.g. reduced back-reflection, also known as S11 parameter). The antenna 730 enhances the received pulse 14 by focusing the pulse 14 to the PCM 720. In the embodiment shown, the read signal is a CW laser that travels through the waveguide 710, and the write signal is an external pulse 14 that is received at the PCM cell 720.

Reading and writing can also be performed electrically. The electrical reading can be obtained by reading the variation of the resistance associated to the phase change of the PCM cell 720. Electrical writing can be achieved through electrothermal heating using the nanoantenna 730 as heating electrodes to heat the PCM cell 720. The antenna 730 increases the capturing cross-section, so that more light from free space enters the PCM, and can heat the PCM and/or magnify the heat from the pulse 14. While the antenna has been shown for use at a narrowed center portion, it can be used with other suitable waveguides, such as a waveguide that is not narrowed.

Figure 10:
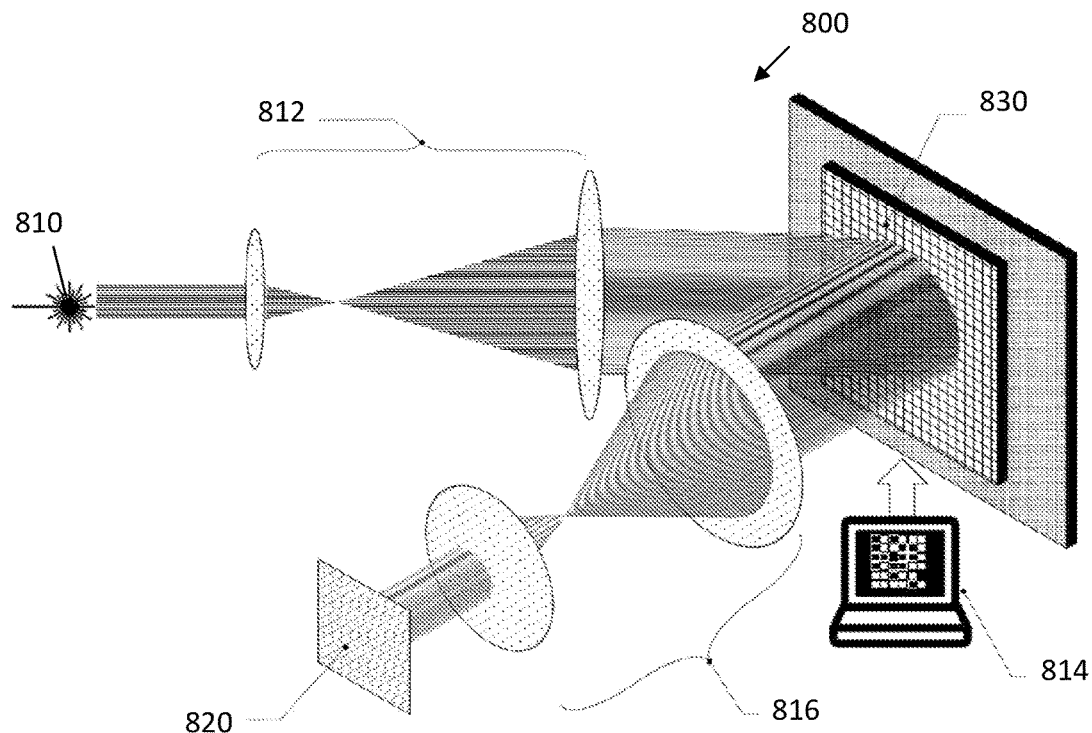
FIG. 10 is a parallel all-optical assembly and system for writing PCM based photonic chip arrays.

Digital Micro-Mirror Device (FIG. 10)

FIG. 10 shows a system 800 for writing and erasing a PCM based photonic chip. After writing, the PCM photonic chip will include an array of regions of different transparencies (e.g. each of the regions may be either transparent or opaque in a certain spectral range). Each of the regions acts as a pixel (hereinafter PCM-pixel) and the PCM-pixels may be disposed in a 2D array. The size of each of the PCM-pixels and the spacing between the PCM-pixels depends on the writing resolution which depends on the writing laser spot size. System 800 is configured to provide a parallel (e.g. writing all PCM-pixels in the array, may be millions of PCM-pixels, at the same time) all-optical writing mechanisms.

The system 800 may include a pulsed laser source 810, a beam expander 812, a digital micro-mirror device (DMD) 830, an optical component 816, a photonic chip 820, and a computer controller 814. The photonic chip 820 may include a continuous PCM film deposited on a transparent substrate. The writing system 800 is configured to write different regions of the PCM film to form the array of PCM-pixels. The DMD includes an array of micro-mirrors which can be controlled individually by the computer controller 814 such as to reflect light in the desired direction.

The micro-mirrors of DMD 830 are used to program (e.g., turn ON/OFF) the PCM-pixels. It can be programmed optically or electronically, and have an optical read out. The collimated pulsed laser source 810 is expanded by the beam expander 812 to cover a substantial part of the DMD 830 (e.g. the entire DMD area or as much as possible). The expanded laser beam light incident on DMD is reflected on the micro-mirrors of the DMD depending on the position of each of the micro-mirrors. Each of the micro-mirrors receives and reflects a corresponding beam-fraction of the incident laser beam. The DMD provides spatial modulation of the beam by reflecting each of the beam-fractions in the desired directions for desired time-lengths. The optical component 816 (e.g. one or more lenses) is configured to direct light reflected by the micro-mirrors onto an array of PCM regions of the photonic chip 820. The beam is resized and aligned to the photonic chip 820 by optical components 816, such as for example one or more lenses and motorized translational stages. The laser light incident on each of the PCM regions provide energy/heating to each of the PCM region so as to set them to the desired state (e.g. crystalline, amorphous, intermediate states).

The controller 814 may be used to position each of the micro-mirrors in the array to redirect the beam-fraction incident on each of the micro-mirrors to the desired directions and for the desired time-lengths. For example, a micro-mirror of the DMD (e.g. at position 256, 650 of the 2D array) may be configured to redirect its beam-fraction through the optical system 816 onto a certain PCM region 821 of the photonic chip. The PCM region is set into the desired state by controlling the amount of heat/energy received from the beam-fraction (e.g. by controlling cell's exposure time/sequence to the laser beam). Once the PCM region 821 is in the desired state, the micro-mirror 831 may be positioned to redirect its beam-fraction away from the photonic chip. The optical component 816 can be designed such as to provide positive or negative magnification of the image formed by the mirrors array. This way the system 800 will be able to write pixels of different size than the pixels of the DMD.

A method 850 for writing a photonic chip (e.g. the photonic chip 820) via system 800 is also disclosed. The method may include one or more of the steps described hereinafter. In a first step, the controller 814 receives a data-file describing the desired state of each of each of the PCM-pixels to be included in the photonic chip PCM array (e.g. amorphous state, crystalline state, intermediary states). The data-file may be a cad file including a 2D image where the pixels of the image represents a PCM-pixel. The controller 814 may calculate the laser beam exposure (e.g. pulse sequence, time length, beam intensity, etc.) needed by each of the PCM-pixels to set the PCM-pixel in the state prescribed by the data-file. The controller may control each of the micro-mirrors in the DMD such as to provide the calculated laser beam exposure to each of the PCM-pixels on the photonic chip 820, thereby setting the PCM-pixels in the state prescribed by the data-file provided by the controller 814.

One advantage of the present embodiment is that PCM cells are capable of switching 10,000 times faster than LCDs.

In another example embodiment, a single PCM cell can be provided that can correlate to multiple bits, to reduce space constraints. For example, Multiple heaters can be arranged on a single PCM cell, each heater aligned with a portion of the PCM cell. The heater can be selectively controlled to change that cell portion to either amorphous state or crystalline state.

The state of each portion will either pass or partially obstruct light passing through the waveguide at that cell portion. Each additional cell portion that partially obstructs the light will relate to the light intensity at the output to indicate to the sensor or detector the value stored by that PCM.

It is further noted that the PCMs are described as being either crystalline or amorphous. However, in some embodiments, the PCM can be in a state that is between fully crystalline or fully amorphous, i.e. multi-state operation. Heat can also be controlled by moving the heater further away from the PCM cell. Moving the heater closes to the waveguide and PCM region improves programming efficiency.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

It is noted that the drawings may illustrate, and the description and claims may use geometric or relational terms, such as right, left, above, below, upper, lower, side, top, bottom, linear, curved, elongated, parallel, perpendicular, rectangular, square, etc. These terms are not intended to limit the disclosure and, in general, are used for convenience to facilitate the description based on the examples shown in the figures. In addition, the geometric or relational terms may not be exact.

What is claimed is:

1. A photonic memory optical device comprising:
a linear optical waveguide having an input that receives a light signal, and an output;
a programmable layer comprising a plurality of nonvolatile photonic memory elements that each selectively at least partially obstructs the light signal, as the light signal passes from the input to the output, wherein the light signal at the output corresponds to information stored at said programmable layer;
a phase change material having an amorphous state and a crystalline state; and
a heating element that selectively places said phase change material into either the amorphous state and the crystalline state to WRITE information to said programmable layer.

2. The photonic memory of claim 1, wherein said plurality of nonvolatile photonic memory elements are equally spaced from each other on top of said optical waveguide between the input and the output.

3. The photonic memory of claim 1, further comprising a phase change material with low losses at the optical communication wavelength for one of its states, said phase change material having an amorphous state and a crystalline state to encode two states of information.

4. The photonic memory of claim 1, wherein the phase change material is placed in the amorphous state and the crystalline state by exposing the phase change material to an electro-magnetic wave to write information to said phase change material.

5. A photonic memory optical device comprising:
a linear optical waveguide having an input that receives a light signal, and an output;
a programmable layer comprising a plurality of nonvolatile photonic memory elements that each selectively at least partially obstructs the light signal, as the light passes from the input to the output, wherein the light signal at the output corresponds to information stored at said programmable layer;
a phase change material having an amorphous state and a crystalline state, and
a capping layer covering said phase change material for passivation.

6. The photonic memory of claim 5, further comprising a heating element that selectively places said phase change material into either the amorphous state and the crystalline state to WRITE information to said programmable layer.

7. The photonic memory of claim 6, wherein the heating element has a proximity to the photonic memory element controlled by a spacer layer.

8. A photonic memory optical device comprising:
a linear optical waveguide having an input that receives a light signal, and an output;
a programmable layer comprising a plurality of nonvolatile photonic memory elements that each selectively at least partially obstructs the light signal, as the light signal passes from the input to the output, wherein the light signal at the output corresponds to information stored at said programmable layer; and
an optical detector that receives the light signal at the output of said waveguide to read the information out of the programmable layer.

9. A photonic memory optical device comprising:
a linear optical waveguide having an input that receives a light signal, and an output; and
a programmable layer comprising a plurality of nonvolatile memory elements that each selectively at least partially obstructs the light signal, as the light signal passes from the input to the output, wherein the light signal at the output corresponds to information stored at said programmable layer, wherein programmability of said plurality of nonvolatile photonic memory elements is performed either based on light absorption, or based on cavity frequency shift, or an interferometric phase-shifting scheme.

10. A photonic memory optical device comprising:
a linear optical waveguide having an input that receives a light signal, and an output, and
a plurality of programmable layer comprising a plurality of nonvolatile photonic memory elements that each selectively at least partially obstructs the light signal, as the light signal passes from the input to the output, wherein the light signal at the output corresponds to information stored at said programmable layer, wherein said plurality of programmable layers are arrange laterally, or horizontally to provide a multi-state photonic memory.

11. A photonic memory optical device comprising:
a linear optical waveguide having an input that receives a light signal, and an output;
a programmable layer comprising a plurality of nonvolatile photonic memory elements that each selectively at least partially obstructs the light signal, as the light signal passes from the input to the output, wherein the light signal at the output corresponds to information stored at said programmable layer; and
a phase change material having an amorphous state and a crystalline state, wherein an optical mode of a READ signal is either photonic, or, plasmonic, or hybrid thereof, whereas for the plasmonic and hybrid modes a metallic-like material is placed in proximity to the phase change material for optical mode modification.

12. A photonic memory optical device comprising:
a linear optical waveguide having an input that receives a light signal, and an output;
a programmable layer comprising a plurality of nonvolatile photonic memory elements that each selectively at least partially obstructs the light signal, as the light signal passes from the input to the output, wherein the light signal at the output corresponds to information stored at said programmable layer; and
a phase change material having an amorphous state and a crystalline state, wherein the phase change material, and the photonic memory, is RESET by applying thermal or optical energy.

13. The photonic device of claim 12, further comprising a heating element that selectively places said one or more nonvolatile photonic elements into either an amorphous state and a crystalline state.

14. A photonic memory device comprising:
- a linear waveguide having an input that receives an input light signal, and an output; a ring waveguide arranged to receive the input light signal from said linear waveguide;
- one or more nonvolatile photonic elements positioned at said ring waveguide to selectively at least partially obstruct the input light signal in said ring waveguide and provide the selectively obstructed light signal to the output of said linear waveguide; and
- a heating element that selectively places said one or more nonvolatile photonic elements into either an amorphous state and a crystalline state.

15. The photonic device of claim 14, further comprising a plurality of nonvolatile photonic elements, wherein said plurality of nonvolatile photonic memory elements are spaced from each other on top of said waveguide.

16. A photonic memory device forming a Mach Zehnder Interferometer, comprising:
- a waveguide having an input portion that receives an input light signal, an output portion, and an intermediate portion between the input portion and the output portion, said intermediate portion having a first waveguide arm that receives the input light signal a second waveguide arm that receives the input light signal;
- one or more first nonvolatile photonic elements positioned at said first waveguide arm to selectively at least partially obstruct the input light signal in said first waveguide arm and provide a first arm optical signal output;
- one or more second nonvolatile photonic elements positioned at said second waveguide arm to selectively at least partially obstruct the input light signal in said second waveguide arm and provide a second arm optical signal output; and
- wherein said first arm optical signal output and said second arm optical signal output are combined at the output portion.

* * * * *